Patented Dec. 5, 1939

2,182,456

UNITED STATES PATENT OFFICE 2,182,456

METHOD FOR THE PRODUCTION OF CHLORINATED RUBBER

William H. Stevenson, Parlin, N. J., assignor to Hercules Powder Company, Wilmington, Del., a corporation of Delaware No Drawing. Application November 26, 1937, Serial No. 176,773

5 Claims. (Cl. 260—772)

This invention relates to a method for the production of chlorinated rubber and more particularly to a method for the production of chlorinated rubber of definite viscosity and to the product thereof.

It is well known that rubber can be transformed to chlorinated derivatives thereof by treatment of the rubber with chlorine under various conditions, the chlorination usually being carried out in a suitable solvent for rubber such as carbon tetrachloride or other solvent which does not react with the chlorine. Raw or crude rubber when dissolved in a solvent, such as, for example, carbon tetrachloride, swells greatly and eventually forms a very viscous solution which contains only a small concentration of rubber and, of course, a high concentration of solvent. In other words, raw or crude rubber is a highly polymerized product and consequently small concentrations thereof in a solvent produce very highly viscous solutions. Treatment of such a product with chlorine, for example, results then in a chlorinated product also having a very high viscosity.

For many purposes, however, such as, for example, lacquers, paints, varnishes and the like, it is impractical to use highly viscous products because to make such operable it is necessary to use large amounts of solvents, which is a serious economic disadvantage.

In order to prepare chlorinated rubber of lower viscosities, various methods have been proposed heretofore for accomplishing this object. It has been proposed to produce chlorinated rubber, capable of forming solutions of low viscosity, by disaggregating rubber by working on a mill and then chlorinating the disaggregated product. To disaggregate the rubber still further, the rolled rubber, in solution in a suitable solvent, is exposed to daylight, or to ultraviolet light. As an alternative to, or in addition to, the milling or mechanical disaggregation of the rubber it may be oxidized, which, when dissolved in a suitable solvent, produces a solution of low viscosity, the reduction in viscosity depending to some extent on the degree of oxidation. Chlorination of the so-oxidized rubber produces a lower viscosity product than the chlorination of a similar rubber not so treated.

All of the processes used heretofore for obtaining solutions of chlorinated rubber of lower viscosity have been open to the objection that the viscosity of these solutions is still considerable and higher than is desirable for many purposes. In addition the processes of disaggregating the rubber result in depolymerization of the rubber, which, upon chlorination, gives products which are objectionable.

I have found that when chlorination of rubber is carried out in solution in carbon tetrachloride a "break" occurs in the partially chlorinated rubber gel, that is, there is a change from a one phase system to a two phase system, and as a consequence there is a rapid decrease in the apparent viscosity of the system. Very surprisingly I have found that the viscosity of the ultimate product may be controlled by controlling the time during which and the temperature at which the partially chlorinated mass is kept as a two phase system, while supplying to the partially chlorinated mass a mixture of chlorine and an oxygen-containing gas, such as, for example, air and continuing the addition of said gas mixture until a chlorinated derivative of rubber is obtained having a desired, pre-determined viscosity and containing at least 64% chlorine.

More particularly, I have found that when chlorination of rubber is carried out in carbon tetrachloride solution at a temperature of about 60° C. and below a "break" occurs, that is, there is a change from a one phase system to a two phase system. This change from a one phase to a two phase system occurs normally at the point where about two-thirds of the chlorine necessary to halogenate the rubber completely has been introduced. The time during which the partially chlorinated mass is present as a two phase system may be prolonged for several hours by keeping the temperature below about 40° C. and continuing the chlorination in the presence of an oxygen-containing gas, such as, for example, air, which results in a high viscosity product. In making a high viscosity product, I prefer allowing the partially chlorinated rubber mass to remain as a two phase system at a temperature of about 30° C. to about 40° C. and extending over a period ranging from about two hours to about five hours. However, if the partially chlorinated rubber mass is kept as a two phase system at a temperature from about 40° C. to about 60° C., and chlorination is continued in the presence of an oxygen-containing gas, such as, for example, air, reversion to the one phase system occurs usually within about one hour, and a lower viscosity product results. Furthermore, when using the latter procedure and blowing in substantial amounts of air, into the reaction mass concurrently with the chlorine during the extent of the time that a two phase system is present and especially immediately following the reversion to the one phase system, a product of very low viscosity is obtained. By low-viscosity chlorinated rubber, I refer to a product having a viscosity less than 20 centipoises and preferably one having a viscosity from three centipoises to twelve centipoises, determined as hereinafter defined. In making a low viscosity product, I prefer allowing the partially chlorinated rubber mass to remain as a two phase system at a temperature of about 40° C. to about 60° C. and extending over a period ranging from about five minutes to about two hours.

I have found that not only is viscosity control facilitated by operating the chlorination process according to my invention, but likewise, the recovery of by-products. The hydrochloric acid produced by the reaction is practically all evolved before the period during which the two phase system is present, so that the operation of the recovery apparatus, especially provided for this and any solvent that may be carried over with the by-product, may be slackened after the two phase system stage is reached, because further losses are small. Furthermore, I have found that my process of making chlorinated rubber is faster than any of the processes previously disclosed and at the same time allows the production of a considerably lower viscosity product, when so desired, than any described by prior processes.

In proceeding in accordance with my invention, rubber is first dissolved in carbon tetrachloride in a suitable jacketed vessel, e. g., either glass lined or lead lined, equipped with a suitable stirring mechanism. After solution has occurred chlorine is introduced into the solution. At the beginning of the chlorination, air may also be introduced for a short interval, if desired, although not essential for the operation of my process, for the purpose of clearing the gas lines and to reduce the density of the rubber solution at the start. The addition of air at this time does not have any substantial effect on the viscosity of the solution. For approximately the first two to three hours of the chlorination reaction, the chlorine is added alone, the temperature of the solution being about 40° C. to about 60° C. It has been found that approximately ⅔ of the total chlorine required is added to the rubber in this interval and that when this point is reached, the partially chlorinated rubber mass, heretofore present as a one phase system, goes to a two phase system, the onset of this phenomenon being indicated by a rapid drop of temperature of the charge from the steady state of the primary chlorination, and by a rapid decrease in the apparent viscosity of the system. This drop in temperature is several degrees centigrade and occurs within a few minutes. In this connection it is also noted that the period during which much hydrochloric acid gas is evolved, ends at this time. Furthermore, at the point where the two phase system reverts to a one phase system, there is a correspondingly sharp increase in the temperature of several degrees centigrade. These points serve to indicate to the operator the state of chlorination, and compensation thereof is attained by additional heating or cooling fluid in the chlorinator jacket to maintain the desired temperature.

From the point where the two phase system occurs, chlorination is carried out slowly, with the addition of air or other oxygen-containing gas, until the chlorine content of the chlorinated rubber is 64% or more. I have found that, for economical operation and speedy chlorination, the volume of air introduced into the reaction vessel should not exceed the volume of chlorine introduced. Furthermore, I have found that it is not desirable to introduce appreciable amounts of air until the time of formation of the two phase system of the partially chlorinated mass, since only here is its viscosity reducing action most effective.

I have found that the temperature and time during which the partially chlorinated mass is present as a two phase system is very important and that it is this interval which controls the viscosity characteristic of the resultant chlorinated product. For a high viscosity product, as above mentioned, the mass is kept as a two phase system for several hours by maintaining the temperature below about 40° C., while continuing the chlorination throughout this period. For the production of the lowest viscosity chlorinated rubber, I have found that the time during which the mass is present as a two phase system should not exceed about 1 hour, during which the temperature is maintained at a temperature of about 45° C. to about 60° C. Temperatures may vary slightly as indicated according to the size of equipment, but the attainment of a low viscosity product is definitely favored by keeping the reaction mass at a temperature of 40° C. and higher, as shown below.

During the two phase system period, the addition of air and chlorine to the reaction mass provides a rapid viscosity reduction, which continues after the mass has reverted to a one phase system. The partially chlorinated rubber is most susceptible to viscosity reduction at the beginning of the formation of the two phase system, and immediate reversion to the one phase system, while adding chlorine and air, reduces the viscosity most rapidly. In the manufacture of a low viscosity product the chlorine content at the point of reversion is never more than 63%, but it may be as low as 52%, depending upon the temperature and the air flow. Chlorination continues after reversion to the one phase system, and it is not until the chlorine content reaches the desired value of 64% or more that the viscosity is reduced to the desired point.

If chlorinated rubber is to be produced economically it is necessary that losses of reagents and solvents be kept at a minimum and this is best accomplished by working from known points along the course of chlorination. Because of stoppages in the flow of gas, variations in the rubber, breaks, leaks, etc., it is often impossible to complete a large scale batch chlorination, taking 12 to 20 hours to complete, on a predetermined schedule; however, by working the batch according to my invention, the process may be readily controlled both with respect to yield and type of product desired.

The procedure according to my invention is particularly applicable to the production of low viscosity chlorinated rubber. I have found that chlorinated rubber with a viscosity of 20 centipoises or less as measured in a 20% by weight solution in toluene at 25° C., as hereinafter defined, still has substantially the good film-forming qualities of chlorinated rubbers of much higher viscosities. I have found, to my surprise, that although the chain length of chlorinated rubbers of 20 centipoises or less, as determined by Staudinger's method, appears to be considerably below that found to give brittle films in the cellulose esters, their film and lacquer properties are outstanding. Data hereinafter shown, demonstrate that weather and corrosion resistance of formulae made with very low viscosity materials are just the same as obtained with much higher viscosity material.

Chlorinated rubbers in the range of 10 centipoises and below have, in greatest measure, the qualities, when used in paints, varnishes, inks, etc., of imparting rapid drying, fast setting up and economy which characterize low viscosity chlorinated rubber. It has been found, for example, that a chlorinated rubber of 5 centipoises viscosity offers a real advantage over one of 6 centipoises viscosity in the rate of setting up of the finish or dope to a tack-free state, which is, for example, of extreme importance in printing inks having these materials incorporated therein.

Where, in the specification and claims, I refer to chlorinated rubber as having a certain viscosity, I mean the viscosity, in centipoises of a 20% by weight solution of the chlorinated rubber in toluene, determined at 25° C. in a capillary type viscometer.

By way of specific illustration of my process and the product thereof, I show the following data.

Example I

To produce a high viscosity chlorinated rubber, I proceed in the following manner: I dissolve 800 parts by weight of milled rubber in 15,840 parts by weight of carbon tetrachloride in a jacketed, closed, agitated vessel provided with suitable gas inlets and outlets. After solution is complete, I pass chlorine gas and air into the mass, under constant agitation, under the following schedule:

| Time elapsed, hours | Temp., °C. | Chlorine flow at standard conditions (liters per minute) | Air flow (liters per minute) | Remarks |
|---|---|---|---|---|
| Start | 37 | 4.1 | None | Viscous solution. |
| 1¼ | 60 | 2.7 | None | Viscous solution. Evolution of hydrochloric acid gas (HCl). |
| 2¾ | 60 | 1.35 | None | Same as previous. |
| 3 | 58 | .35 | None | Two phases. Evolution of HCl diminishes. |
| 3½ | 51 | 1.35 | 1.0 | Two phases, slight HCl evolution. |
| 5½ | 30 | .7 | 0.1 | Two phases. |
| 6 | 30 | .35 | 0.1 | Do. |
| 7 | 30 | .35 | 0.1 | One phase. |
| 8 | 30 | .35 | 0.1 | Completely chlorinated. |

The viscosity of this chlorinated rubber after precipitating, washing, and drying thoroughly, is 157 centipoises.

Example II

A solution prepared as in the example above is chlorinated in a similar apparatus, according to the following schedule:

| Time elapsed, hours | Temp., °C. | Chlorine flow at standard conditions (liters per minute) | Air flow (liters per minute) | Remarks |
|---|---|---|---|---|
| Start | 31 | 4.5 | None | Viscous solution. |
| 1 | 55 | 2.6 | None | Viscous solution. Evolution of hydrochloric acid gas (HCl). |
| 2 | 57 | 2.0 | None | Same. |
| 2¼ | 58 | 1.35 | None | Do. |
| 2¾ | 53 | 0.7 | 0.5 | Two phases, slight, HCl evolution. |
| 5¾ | 40 | 1.0 | 0.2 | Reversion to one phase. |
| 7½ | 40 | 0.7 | 0.1 | Thin solution. |
| 8½ | 40 | 0.3 | 0.1 | Do. |
| 9½ | 40 | 0.3 | 0.1 | Completely chlorinated. |

The viscosity of this chlorinated rubber, after precipitating, washing, and drying thoroughly, is 11 centipoises. Although slightly higher temperatures were used in Example I than in Example II, and likewise more air was blown into the solution in the first example, the viscosity of the product is considerably higher than that of the second example. I believe this to be accounted for by the fact that the length of "break" in Example II is only one-half that used in the first example.

Example III 800 parts by weight of rubber are dissolved in 15,840 parts by weight of carbon tetrachloride at room temperature in a jacketed, glass-lined vessel equipped with an anchor stirrer. After solution is complete, chlorine and air are then passed into the mass according to the following schedule:

| Time elapsed, hours | Temp., °C. | Chlorine flow at standard conditions (liters per minute) | Air flow (liters per minute) | Remarks |
|---|---|---|---|---|
| Start | 30 | 5.9 | 1.0 | Viscous solution. |
| ¼ | 38 | 5.9 | None | Do. |
| 2 | 50 | 5.9 | None | Do. |
| 2¼ | 50 | 1.5 | 0.6 | Two phase system. |
| 3 | 50 | 1.5 | 1.2 | One phase system. Solution now very fluid. |
| 4½ | 50 | 0.75 | 0.5 | Same. |
| 6½ | 50 | 0.38 | 0.3 | Solution still more fluid. |
| 10½ | 50 | 0.75 | 0.3 | Viscosity of solution still decreasing. |
| 15 | 50 | 0.75 | 0.3 | Chlorination complete. |

The viscosity of this chlorinated rubber, after precipitating, washing, and drying thoroughly, is 3.6 centipoises. The chlorine content is 68%.

When lacquers are formulated from chlorinated rubber similar in viscosity characteristics to those above shown and subjected to various tests, the following results are obtained.

Formulation

| Composition | Formula No.— | | | |
|---|---|---|---|---|
| | 1 | 1A | 2 | 2A |
| Chlorinated rubber (65% Cl₂ or more) | 10 | 10 | 10 | 10 |
| Methyl abietate (hydrogenated) | 5 | 6 | | |
| Thermolyzed tung oil | | | 5 | 5 |
| Red iron oxide paste | | 10 | | 10 |

Compositions shown are in parts by weight and only the non-volatile portion of the formula is shown. Any suitable solvent composition may be used.

These compositions were sprayed on steel panels and subjected to the tests shown, with the results as presented.

| Viscosity of chlorinated rubber | 6 centipoises | | | | 20 centipoises | | | | 125 centipoises | | | |
|---|---|---|---|---|---|---|---|---|---|---|---|---|
| Formula No. | 1 | 1A | 2 | 2A | 1 | 1A | 2 | 2A | 1 | 1A | 2 | 2A |
| Adhesion | B | — | A | — | B | — | A | — | C | — | A | — |
| Days life exposed on steel: | | | | | | | | | | | | |
| Under water | 12 | 22 | 9 | 12 | 12 | 23 | 7 | 22 | 12 | 23 | 5 | 13 |
| Under 2% NaCl | 16 | 7 | 5 | 15 | 7 | 14 | 5 | 15 | 13 | 9 | 5 | 15 |
| Under 5% NaOH | 14 | 22 | 9 | 16 | 16 | 14 | 7 | 16 | 12 | 13 | 5 | 16 |
| Under 10% HCl | 5 | 9 | 12 | 12 | 7 | 14 | 15 | 15 | 7 | 7 | 7 | 9 |
| *Weather resistance* | | | | | | | | | | | | |
| Atlas weatherometer, 3 months | D | — | D | — | C | — | C | — | D | — | B | — |
| Appearance—4 months | — | D | — | B | — | D | — | B | — | D | — | B |
| Florida exposure, 3 months | | | | | | | | | | | | |
| General appearance | — | D | — | C | — | D | — | A | — | D | — | B |
| Gloss | — | C | — | B | — | C | — | A | — | C | — | B |
| Chalking | — | B | — | A | — | B | — | A | — | B | — | A |
| Checking | — | D | — | D | — | D | — | B | — | D | — | C |

Rating:
A—Excellent.
B—Good.
C—Fair.
D—Poor.

It is apparent from observation of the weathering and corrosion resistance data, above shown, that the low viscosity products are equally as good as the high viscosity product. Where a high non-volatile content is necessary in a composition for economical reasons it is thus seen that a very low viscosity product may be advantageously used, without the sacrifice of essential requirements.

It will be understood that the process in accordance with this invention comprises essentially the control of the viscosity of chlorinated rubber to any desired predetermined figure, by the control of the time and temperature at which a carbon tetrachloride solution of a partially chlorinated rubber exists as a two phase system, while treating the reaction mixture from the beginning of the formation of the two phase system until the completion of the chlorination, with chlorine and an oxygen-containing gas, such as, for example, air, as described herein in detail for illustrative purposes. It will further be understood that various modifications may be made in the process as described without departing from the scope of the invention. The product, as will be understood, comprises the chlorinated rubber produced by the process.

Furthermore, it will be understood that in my process, air, oxygen or any other gas containing uncombined oxygen may be used and will, hereinafter, be referred to as oxygen-containing gas.

What I claim and desire to protect by Letters Patent is:

1. A chlorinated derivative of rubber produced according to the process of claim 3.

2. A method for the manufacture of a chlorinated derivative of rubber which includes treating rubber in solution in carbon tetrachloride with chlorine at a temperature within the range from about 40° C. to about 60° C. until the chlorine content is within the range from about 52% to about 63%, treating said partially chlorinated rubber, while in said range of partial chlorination for a period from about 2 hours to about 5 hours and at a temperature within the range from about 30° C. to about 40° C., with a mixture of chlorine and an oxygen-containing gas and thereafter continuing the addition of said gas mixture until a chlorinated derivative of rubber is obtained having a viscosity greater than about 20 centipoises and containing at least 64% chlorine.

3. A method for the manufacture of a chlorinated derivative of rubber which includes treating rubber in solution in carbon tetrachloride with chlorine at a temperature within the range from about 40° C. to about 60° C. until the chlorine content is within the range from about 52% to about 63%, treating said partially chlorinated rubber, while in said range of partial chlorination for a period not exceeding about 2 hours and at a temperature within the range from about 40° C. to about 60° C., with a mixture of chlorine and an oxygen-containing gas, and thereafter continuing the addition of said gas mixture until a chlorinated derivative of rubber is obtained having a viscosity less than about 20 centipoises and containing at least 64% chlorine.

4. A method for the manufacture of a chlorinated derivative of rubber having a pre-determined viscosity which includes treating rubber in solution in carbon tetrachloride with chlorine at a temperature not exceeding about 60° C. until the chlorine content is within the range from about 52% to about 63%, treating said partially chlorinated rubber, while in said range of partial chlorination for a period of time and at a temperature depending upon the viscosity desired in the ultimate product, with a mixture of air and chlorine in the ratio of not more than about one volume of air for each volume of chlorine and thereafter continuing the addition of said gas mixture until a chlorinated derivative of rubber is obtained containing at least 64% chlorine.

5. A method for the manufacture of a chlorinated derivative of rubber which includes treating rubber in solution in carbon tetrachloride with chlorine at a temperature within the range from about 40° C. to about 60° C. until the chlorine content is within the range from about 52% to about 63%, treating said partially chlorinated rubber, while in said range of partial chlorination for a period not exceeding about 2 hours and at a temperature within the range from about 40° C. to about 60° C., with a mixture of air and chlorine in the ratio of not more than about one volume of air for each volume of chlorine and thereafter continuing the addition of said gas mixture until a chlorinated derivative of rubber is obtained having a viscosity less than about 20 centipoises and containing at least 64% chlorine.

WILLIAM H. STEVENSON.